United States Patent [19]

Waldrop et al.

[11] Patent Number: 5,065,521

[45] Date of Patent: Nov. 19, 1991

[54] MAGNETIC FIELD MEASUREMENT AND COMPASS CALIBRATION IN AREAS OF MAGNETIC DISTURBANCE

[75] Inventors: John L. Waldrop; Clarence B. Glover, both of Albuquerque, N. Mex.

[73] Assignee: Honeywell Inc., Minneapolis, Minn.

[21] Appl. No.: 561,151

[22] Filed: Aug. 1, 1990

[51] Int. Cl.$^5$ .............................................. G01C 17/38
[52] U.S. Cl. ........................................ 33/361; 73/1 E
[58] Field of Search .................. 33/361, 362, 356, 357; 73/1 E

[56] References Cited

U.S. PATENT DOCUMENTS

| | | | |
|---|---|---|---|
| 2,887,873 | 5/1959 | Halpern et al. | 73/1 E |
| 3,678,593 | 7/1972 | Baker et al. | |
| 4,327,948 | 5/1982 | Setter et al. | |
| 4,338,810 | 7/1982 | Gollomp | 73/1 E |

OTHER PUBLICATIONS

Magnetic Field Sensor-Description and Operation.

Primary Examiner—Harry N. Haroian
Attorney, Agent, or Firm—Haugen and Nikolai

[57] ABSTRACT

A magnetic compass calibration system used in areas of magnetic disturbance. The invention allows the aircraft to remain in the hangar or hangar area while the aircraft's compass is compensated. The invention compensates for time variances in ambient magnetic field, as well as magnetic variances caused by hard and soft iron found in the hangar area, ramp area or aircraft.

10 Claims, 3 Drawing Sheets

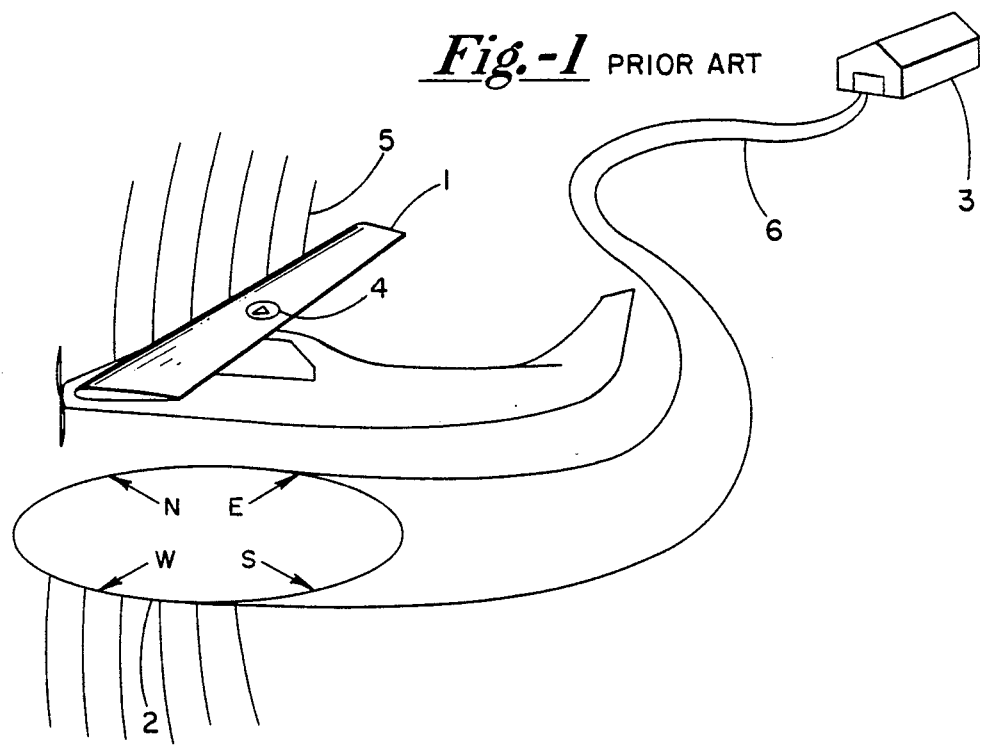
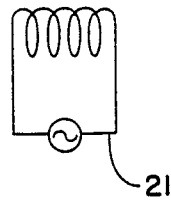
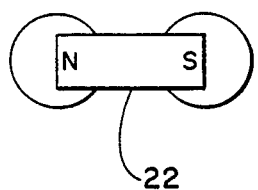
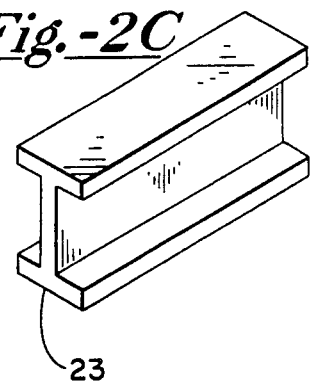
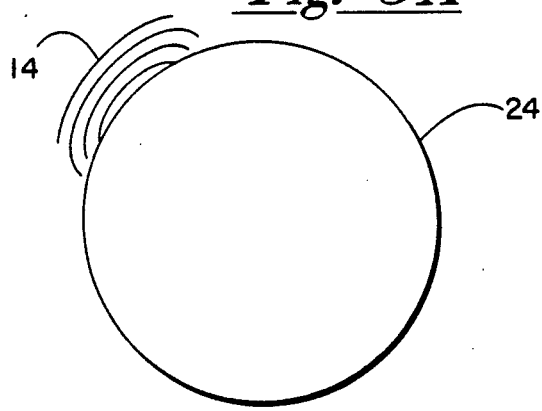
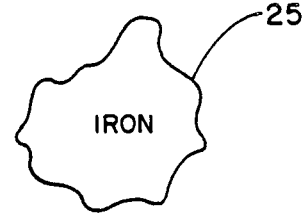

MAGNETIC FIELD MEASUREMENT AND COMPASS CALIBRATION IN AREAS OF MAGNETIC DISTURBANCE

FIELD OF THE INVENTION

This invention relates to magnetic compass compensation systems, and more specifically to aircraft magnetic compass compensation in areas of magnetic disturbance such as airport hangars and ramps.

DESCRIPTION OF THE PRIOR ART

A good description of prior art magnetic compass compensation systems can be found in U.S. Pat. No. 4,327,498 to Setter and Kesselring. U.S. Pat. No. 4,327,498 is hereby incorporated by reference.

As illustrated in FIG. 1, to avoid areas of magnetic disturbance, aircraft compasses are calibrated by moving the aircraft to a special area known as a compass rosette 2. The compass rosette 2 is located in an area away from sources of magnetic disturbance and in a magnetic field 5 which is as uniform as possible. The aircraft 1 is lined up with the compass rosette 2 and errors are checked in the compass system. For example, if the aircraft is pointing north according to the compass rosette, the difference from north is read from the aircraft's compass and is used to calibrate the compass. The compass compensation is done manually using potentiometers or with magnets located on top of the flux valve 4. The aircraft is rotated through the full 360° of the compass at each angle of 90° of the compass, namely, 0°, 90°, 180°, and 360°. Some systems allow the electrical rotation of the magnetic field to simulate the rotation of the plane. In both cases, the compass is constructed out of a magnetic flux valve 4 which measures the magnetic field 5 passing through the magnetic flux valve 4. The magnetic field 5 passing through the valve 4 is composed of the earth's magnetic field and any local fields.

One example of a flux valve is taught in U.S. Pat. No. 3,873,914 to Kesselring. U.S. Pat. No. 3,873,914 is hereby incorporated by reference. The magnetic flux valve is constructed using three coils offset 120° from each other. An AC signal is input to the coils and the resulting magnitude through the coil is sensed. The magnitude of the AC signal is proportional to the magnetic field at the point of the coil.

Aircraft compasses require calibration every six months to twelve months. The necessity to transport an aircraft away from its natural hangar environment, coupled with the frequency of calibration requirement, make compass calibration a real and significant burden on aircraft operators.

A magnetic compass must be compensated for either hard iron disturbances or soft iron disturbances. Hard iron disturbances traditionally include current in a wire, such as wire 21 shown in FIG. 2A, magnets 22 as shown in FIG. 2B and ferrous material 23 as shown in FIG. 2C. The current bearing wire 21 may be, for example, a wire carrying digital or analog signals or power. Another source of disturbance for a compass is caused by soft iron 25 as shown in FIG. 3, which would include some nickel alloys. Sources of hard iron and soft iron disturbances are often found in hangars, airframes and aircraft guidance systems, for example. The earth's magnetic field 14, as shown in FIG. 3A, can also change from time to time, making compass calibration difficult.

A third type of disturbance that effects aircraft compass calibration is called index error. Index error arises from misalignment of the flux valve coils with the earth's magnetic field. Also, the flux valve coils must be compensated for the magnetic effect that they have on each other. The measurement of the induced current in one coil will affect the measurement of induced current in another coil.

Prior workers in the field of compass compensation have proposed compensation systems that operate in severe magnetic field disturbances, such as illustrated by Setter and Kesselring in U.S. Pat. No. 4,327,498. Setter and Kesselring address the dynamic compensation of a magnetic compass system in a tank which is subject to varying magnetic fields as it moves. The Setter and Kesselring scheme achieves a small error goal of +3° by utilizing two flux valves subject to a similar magnetic field. One valve provides a reference with respect to the axis of the tank while the other valve measures the varying field. In regard to compensation of an aircraft compass system, the Setter and Kesselring scheme falls short. The planned for error of ±3° is almost 3000% more error than can be tolerated in an aircraft compass which may need less than ±0.1° of error. Even if the Setter and Kesselring system could be modified to achieve a smaller error signal, inherent design characteristics limit its applicability to ambient magnetic field environments where the reference and calibrated flux valves experience a similar, if not identical field, a field which is typically not available in an aircraft hangar or aircraft ramp.

The present invention, therefore, springs from a desire to provide a high degree of accuracy magnetic compass compensation system with less than ±1° of error, that can operate in a typical airport hangar/ramp environment and that can be used to calibrate a typical aircraft magnetic compass system.

SUMMARY OF THE INVENTION

It is one object of this invention to compensate a magnetic compass system.

It is a further object of the invention to compensate a magnetic compass system in a distressed magnetic field.

It is yet another object of the invention to compensate a magnetic compass system in a hangar or an airport ramp.

The invention provides a compass calibration and magnetic field measurement system wherein the system has a monitor flux valve, an aircraft flux valve, an aircraft flux valve turntable and a nonmagnetic stand.

The invention provides a magnetic compass calibration and magnetic field measurement system that allows the aircraft, whose compass is to be calibrated, to remain in the hangar, hangar area or ramp. A monitor flux valve measures the magnetic environment some distance from the plane. In axis with the monitor is a turntable. The aircraft's flux valve is removed from the aircraft and placed on the turntable. The magnetic environment is measured while the aircraft's flux valve is on the turntable and the aircraft is removed from the measurement area. The aircraft is then returned to the measurement area, the flux valve is installed and the magnetic environment is measured. The monitor allows compensation for any variances in the ambient magnetic environment. To improve field measurement accuracy in distressed fields, the turntable and flux valve can be placed in a position approximating the installed aircraft flux valve's position. All flux valve measurements must be made with the flux valve reference axes parallel with each other.

Other objects, features and advantages of the invention will become apparent through the drawings, description of the preferred embodiment and claims herein.

BRIEF DESCRIPTION OF THE DRAWINGS

To illustrate the invention, a preferred embodiment of this invention will be described hereinafter with reference to the accompanying drawings. The preferred embodiment concerns a magnetic compass compensation system utilizing a monitor and flux valve turntable.

FIG. 1 shows an aircraft undergoing calibration at a compass rosette.

FIG. 2 shows a block diagram of one example of a compass calibration system as provided by the invention.

FIG. 2A shows a schematic diagram of a magnetic disturbance generated by alternating current in a wire.

FIG. 2B shows a magnetic disturbance generated by a magnet.

FIG. 2C shows a magnetic disturbance generated by ferrous material.

FIG. 3A shows a magnetic interference generated by the magnetic field encompassing the earth.

FIG. 3B shows a magnetic disturbance generated by a soft iron.

DESCRIPTION OF THE PREFERRED EMBODIMENT

Figure 6:
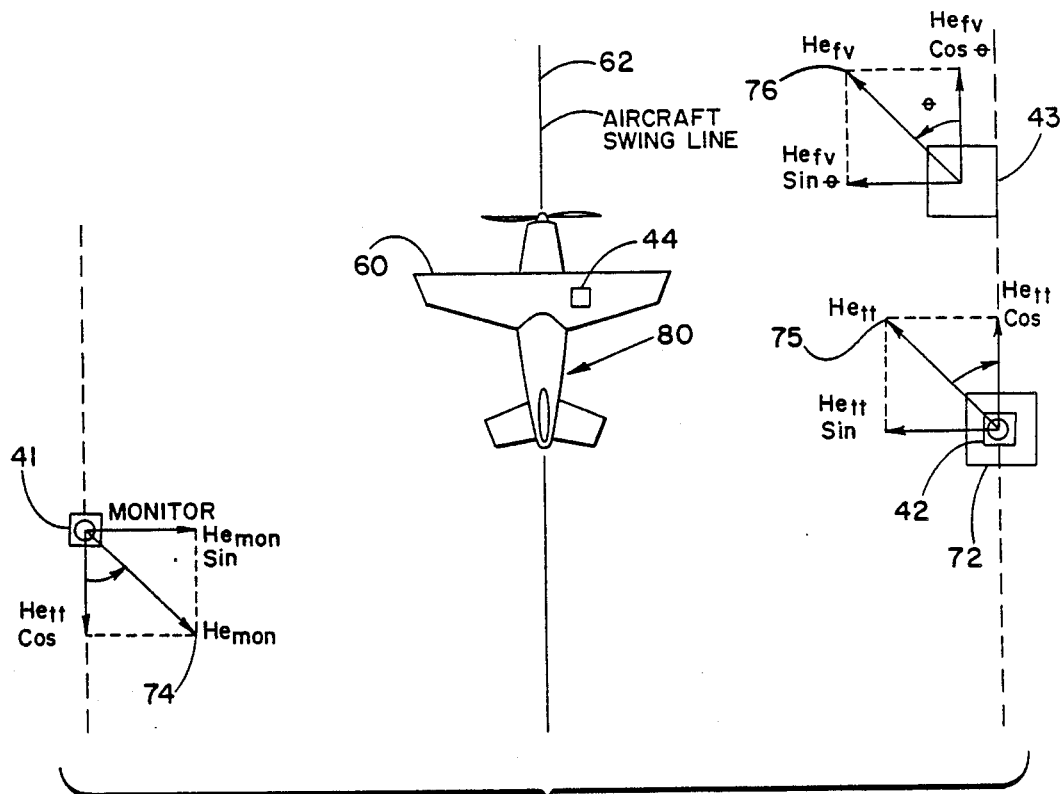

Referring now to FIG. 6, a vector diagram of one example of a compass calibration system as provided by the invention is shown. There are four potential flux valve measurement locations in the system. The system includes a compass calibration computer 45 which can accept information from a flux valve sensor 41 and a turntable location 42. Each location is used to with the monitor flux valve to relay data to the compass calibration computer 45 about the local magnetic field. The monitor flux valve 41 is used as the reference flux valve in the system. The turntable is used in conjunction with the monitor flux valve 41 to measure the relative change in magnetic flux between where the monitor is and where the turntable is. The first is the monitor flux valve location 91 and the second is the turntable location 92. The third position 93 is located closely approximate to the position of the aircraft's flux valve 44 when the aircraft 80 is in the measuring area. The measuring area could be a hangar or in a separate measurement building. The only requirement is that the monitor flux valve location 91, turntable flux valve location 92 and pseudo plane position flux valve location 93 be in the same general area. The inputs of both flux valves are sent to the compass calibration computer 45. One such compass calibration computer which may be used in the system is available as the Honeywell MC2000.

Figure 4:
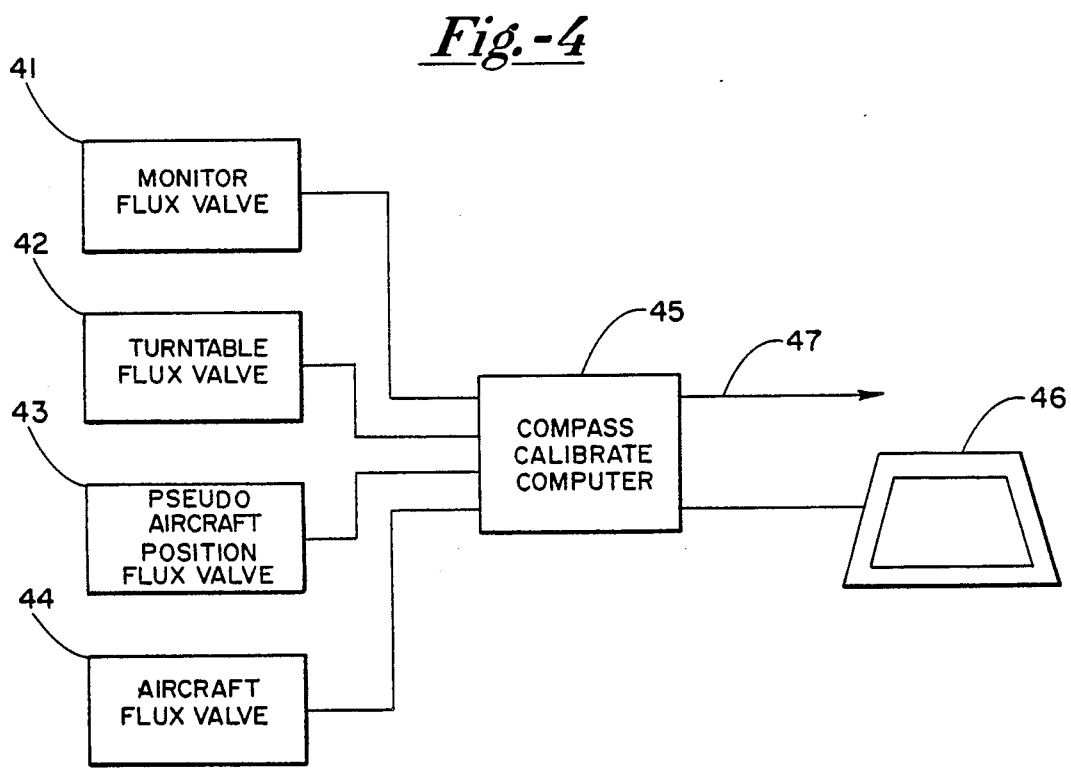
FIG. 4 shows a vector diagram of the compass compensation system used to compensate an aircraft compass.
Figure 5:
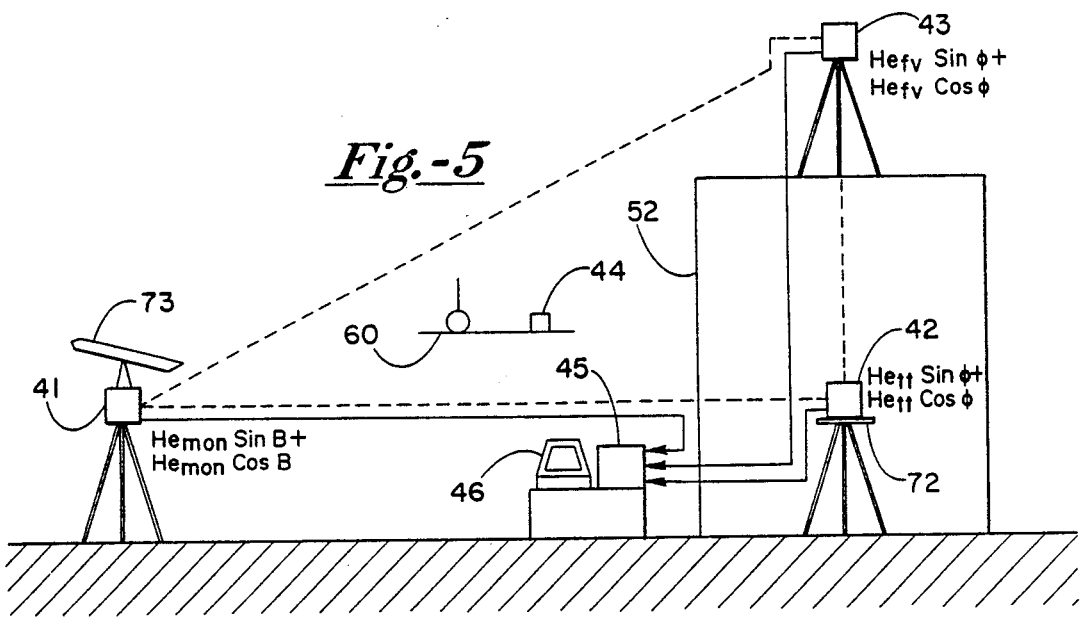
FIG. 5 shows a basic magnetic compass calibration compensation system and FIG. 6 shows a sector diagram of an example of a compass calibration system.

Referring now to FIG. 5, a diagram of the basic magnetic compass compensation system is shown. The basic system includes a monitor flux valve 41, a transit 73, and a turntable 72. In the basic magnetic flux measurement system, the monitor flux valve 41 is mounted with the transit 73. The ambient magnetic field is measured through the flux valve in these positions.

The axis of the monitor flux valve 41 can be aligned using the transit 73 to spy on the swing line 62 of the aircraft 80. When the aircraft's flux valve 44 is removed from the aircraft and placed on the turntable 72, the resulting magnetic field difference stored in the compass calibration computer 45, can be used to calibrate the aircraft's flux valve 44 in the aircraft.

Now referring to FIG. 6, a diagram of the calibration of an aircraft compass in a hangar area is shown. The compass calibration system is used to calibrate an aircraft flux valve 44. At monitor flux valve location 91 the magnetic field is indicated by the magnetic field vector $He_{mon}$ 74. The magnetic field vector at the turntable flux valve location 92 is indicated by $He_{tt}$ 75, and the magnetic field vector at the aircraft flux valve location 93 is indicated by $He_{fv}$ 76. The angle subtended from the axis 86 of the flux valve 44 in the aircraft location to the magnetic field at this location is indicated by theta ($\theta$). The angle subtended from the monitor magnetic field vector 74 and the axis 82 of the monitor flux valve is indicated by beta ($\beta$). The angle subtended from the axis 84 of the turntable flux valve 42 to the magnetic field at the turntable is indicated by phi ($\phi$). All flux valve axes, 82, 84 and 86, must be made parallel to the swing line 62 of the aircraft 60.

The magnetic profile is determined either at the level where the flux valve will be located in the aircraft, a special nonmagnetic stand 52 (shown in FIG. 5) may be used to reach this area, or an area that approximates the aircraft compass 44 location when installed in the aircraft. The magnitude and direction of the magnetic field at the aircraft flux valve location 93, at the turntable location 92 and the monitor location 91 may now be determined using the monitor 41. The magnetic field at the aircraft flux valve location 93 can be described by:

$$He_{fv}Sin\theta \pm He_{fv}Cos\theta,$$

where $He_{fv}$ is the horizontal field strength through the aircraft flux valve 44 and $\theta$ is the angle subtended from the magnetic field vector to the swing line 62 of the aircraft 80 at the aircraft flux valve location 93.

Similarly, the magnetic field at the turntable location 92 may be determined as:

$$He_{tt}Sin\theta + He_{tt}Cos\phi,$$

where $He_{tt}$ is the horizontal field strength at the turntable 72 location, and $\phi$ is the angle subtended from the magnetic field vector to the aircraft swing line 62 at the turntable location.

The magnetic field at the monitor location 91 may also be determined in a similar manner as $$He_{mon}Sin\beta + He_{mon}Cos\beta,$$

where $He_{mon}$ is the horizontal field strength at the monitor 50 location, and $\beta$ is the angle subtended from the magnetic field vector to the aircraft swing line 62 at the monitor location.

The difference in the magnetic field between the monitor location 91 and the aircraft flux valve location 93 is calculated as shown below:

$$delta\_Sin1 = He_{fv}Sin\theta - He_{mon}Sin\beta, \text{ and}$$

$$delta\_Cos1 = He_{fv}Cos\theta - He_{mon}Cos\beta.$$

Also, the difference in the magnetic field between the turntable location 92 and the flux valve location 93 is calculated as:

$$delta\_Sin2 = He_{fv}Sin\theta - He_{tt}Sin\phi, \text{ and}$$

$$delta\_Cos2 = He_{fv}Cos\theta - He_{tt}Cos\phi.$$

Once the above delta values are determined and stored, the magnetic field at the flux valve location may be described in terms of the magnetic field at the turntable location 92 by:

$$He_{fv}Sin\theta = He_{tt}Sin\phi + delta\_Sin2, \text{ and}$$

$$He_{fv}Cos\theta = He_{tt}Cos\phi + delta\_Cos2.$$

The magnetic field at the flux valve location 93 may also be described in terms of the magnetic field at the monitor location 91 by:

$$He_{fv}Sin\theta = He_{mon}Sin\beta + delta\_Sin1, \text{ and}$$

$$He_{fv}Cos\theta = He_{mon}Cos\beta + delta\_Cos1.$$

As long as the delta values remain constant for a particular area, the magnetic field for one area can be determined in terms of the other.

The aircraft flux valve 44 characterization may now be performed at the turntable location 92 to emulate the field at the aircraft flux valve location 93. Also, any changes in the earth's magnetic field detected by the monitor flux valve 41 may be translated to the field at the aircraft flux valve 44 location and compensated. The aircraft swing line is made parallel with the turntable 72 reference axis 84 and the monitor flux valve 41 reference axis so that the reinstalled aircraft flux valve 44 will be in the proper orientation when calibrated.

To summarize the above, the magnitude and direction of the magnetic field are measured at each of the three locations, namely, the aircraft flux valve location 93, the turntable location 92, and the monitor location 91 by measuring the field at each location using the monitor flux valve. The delta values are then determined as previously described and the values stored in the compass calibration computer.

One alternative approach of the invention is to use only two positions, the aircraft flux valve position 93 and the monitor position 91. The primary reason for using the turntable position 91 is to allow the operator easy access to the aircraft flux valve 44 during characterization.

The aircraft flux valve 44 is now removed from the aircraft and placed on the turntable 92. The aircraft is removed from the area. The turntable 72 and tripod are located at the turntable location 92. The monitor flux valve 41 remains at the monitor location 91, pointing in the direction parallel to the swing line 62.

We are now ready to characterize the aircraft flux valve 44, by determining its sensitivity and crosstalk values. Sensitivity is a measure of the current in the flux valve coils that is required to cancel the ambient field. Crosstalk values are quadrature fields created in the flux valve when an electrical swing is performed by running currents through the flux valve legs.

The flux valve is first indexed so that the coil of the A leg is aligned with the magnetic field. This is accomplished by rotating the flux valve on the turntable at all the cardinal headings and noting the heading output from the flux valve. The deviations of the flux valve readings from the turntable indices are added and divided by four. This derivation is called the index. The flux valve readings and the index computation are done in the compass calibration computer. The flux valve is then rotated by the amount calculated by the compass calibration computer so that the index is zero.

A manual eight heading swing is next performed at 45 degree increments. The deviations at each heading are recorded by the compass calibration computer. Output voltages from the flux valve 10 are read and recorded at the cardinal headings. These values are used to determine the E1 and E2 voltages as follows:

$$E1 = (voltage\ at\ 0\ degrees + voltage\ at\ 180\ degrees)/2$$

$$E2 = (voltage\ at\ 90\ degrees + voltage\ at\ 270\ degrees)/2$$

These values are then used in a four heading electrical swing to determine the crosstalk values. The equations for the currents going to the flux valve legs are given below:

For a current servo interface:

$$A_{LEG} = 32\cos(30)E1(\cos\psi - \cos=) + E2(\sin\psi - \sin\alpha)$$

$$B_{LEG} = 0$$

$$C_{LEG} = E2(\sin\psi - \sin\alpha)$$

For a control transformer interface:

$$A_{LEG} = \cos(30)E1(\cos\psi - \cos\alpha)$$

$$B_{LEG} = 0.5E2(\sin\psi - \sin\alpha)$$

$$C_{LEG} = 0.5E2(\sin\psi - \sin\alpha)$$

where $\psi$ is the electrical swing angle, and $\alpha$ is the position of the flux valve on the turntable, which is set to 0 degrees.

The reason for two sets of equations for a CT and current servo is as follows: A CT or "control transformer" is used in many existing compass systems as an interface in a control loop in the aircraft compass system. In this type of system, swinging currents are fed to all three legs of the flux valve, which is the normal case.

In a current servo system however, direct current is fed to only two legs of the flux valve. See, for example, U.S. Pat. No. 3,678,598 to Donald A. Baker, et al., entitled "Compass System and Components Therefor Having Automatic Field Cancellation", which describes compensation in a current servo system. U.S. Pat. No. 3,628,593 is incorporated herein by reference. In such a system, currents are always flowing in the two coils in order to null the output of the flux valve. When an electrical swing is performed, the currents coming from the calibrator go to the same two legs used in the feedback of the current servo. This scheme is more accurate than feeding currents to all three legs. The swinging currents will precisely cancel the currents in the feedback path of the current servo, eliminating stray fields which would be difficult to quantify.

After the electrical swing is performed, the crosstalk values are determined by:

$$\Delta 180 = \frac{EL_{180} + MAN_{180}}{2}$$

$$\Delta 270 = \frac{(EL_{90} - MAN_{90}) + (EL_{270} - MAN_{270})}{2}$$

where EL is the electrical swing error at the respective heading and MAN is the heading error at the respective heading during the manual swing. These values are then used in the swing equations as follows:
for a current servo interface:

$$A_{LEG} = \cos(30) \cdot [E1(\cos\psi - \cos\alpha) + \Delta 270 \cdot E2(\sin\psi - \sin\alpha)]$$

$$B_{LEG} = 0$$

$$C_{LEG} = E2(\sin\psi - \sin\alpha) - \Delta 180 \cdot [\cos(30) \cdot E1(\cos\psi - \cos\alpha)]$$

for a control transformer interface:

$$A_{LEG} = \cos(30) \cdot [E1(\cos\psi - \cos\alpha) + \Delta 270 \cdot E2(\sin\psi - \sin\alpha)]$$

$$B_{LEG} = 0.5 \cdot E2(\sin\psi - \sin\alpha) - \Delta 180 \cdot \cos(30) \cdot E1(\cos\psi - \cos\alpha)$$

$$C_{LEG} = -B_{LEG}$$

A second electrical swing is performed at $\alpha = 0$, for $\psi$ values of 90 and 270 degrees. From this swing the value of EW is determined as:

$$EW = \frac{(EL_{90} - MAN_{90}) - (EL_{270} - MAN_{270})}{2}$$

where EL and MAN are the electrical and manual swing errors respectively. The EW value is used to correct the E value used in the swing equations.

$$E1C = E1(1 - \tan(EW))$$

where E1C is the corrected value of E1.

Another two heading swing is performed using the corrected value of E1, this time for a $\psi$ of 90 degrees, and $\psi$ values of 0 and 180 degrees. From this swing, the value of NS is determined as:

$$NS = \frac{(EL_0 - MAN_0) - (EL_{180} - MAN_{180})}{2}$$

where EL and MAN are the electrical and manual swing errors respectively. This value of NS is used to correct the E2 value used in the swing equations.

$$E2C = E2(1 + \tan(NS))$$

where E2C is the corrected value of E2. Using the corrected values of E1 and E2, a four heading electrical swing is performed with $\psi = 90$ degrees and $\psi =$ the intercardinal headings of 45, 135, 225, and 315 degrees. The resulting data is used to determine an ICARD value as:

$$ICARD = [(EL_{45} - MAN_{45}) - (EL_{135} - MAN_{135}) + (EL_{225} - MAN_{225}) - (EL_{315} - MAN_{315})]/4$$

where EL and MAN are the electrical and manual swing errors at the respective headings.

This value of ICARD is used to remove the intercardinal two cycle errors from the electrical swing currents as:

$$E2S = E2C \left[ \frac{1 - \tan ICARD}{1 + \tan ICARD} \right]$$

where E2S is a value used to determine the swing current. A value of E1S could also be similarly obtained after correcting for cardinal two cycle errors, however it has been shown that these errors are very small. The value of E1C is therefore used as a good approximation for E1S.

The final set of swing equations now appear as follows:
for a current servo interface:

$$A_{LEG} = \cos(30) \cdot E1C(\cos\psi - \cos\alpha) + (\Delta 270 + 0.5)(E2S \cdot \sin\psi - E2C \cdot \sin\alpha)$$

$$B_{LEG} = 0$$

$$C_{LEG} = E2S \cdot \sin\psi - E2C \cdot \sin\alpha - \Delta 180[\cos(30) \cdot E1C \cdot (\cos\psi - \cos\alpha) + 0.5(E2S\sin\psi - E2C \cdot \sin\alpha)]$$

for a control transformer:

$$A_{LEG} = \cos(30) \cdot E1C(\cos\psi - \cos\alpha) + \Delta 270(E2S \cdot \sin\psi - E2C \cdot \sin\alpha)$$

$$B_{LEG} = 0.5(E2S \cdot \sin\psi - E2C \cdot \sin\alpha) - \Delta 180 \cdot \cos(30) \cdot E1C(\cos\psi - \cos\alpha)$$

$$C_{LEG} = -B_{LEG}$$

The values of E1C, E2C, $\Delta 180$, $\Delta 270$, and E2S are the characterization values for the particular flux valve being swung. If a particular aircraft has two flux valves, the above is repeated for the second valve. Before these values are used, they must be adjusted for the existing magnetic field conditions.

The delta values for the flux valve in terms of the turntable readings are given as:

$$He_{ff}\sin\theta = He_{tt}\sin\phi + \Delta\sin 2$$

$$He_{ff}\cos\theta = He_{tt}\cos\phi + \Delta\cos 2$$

Values of E1C, E2C, and E2S modified for the flux valve location as follows:

The total field $He_{fv}$ 76 is:

$$He_{fv} = [(He_{fv}\sin\theta)^2 + (He_{fv}\cos\theta)^2]^{\frac{1}{2}}$$

and similarly the total field $He_{tt}$ 75 is:

$$He_{tt} = [(He_{tt}\sin\theta)^2 + (He_{tt}\cos\theta)^2]^{\frac{1}{2}}$$

The values of E1C, E2C and E2S are multiplied by the factor $$\frac{HE_{fv}}{HE_{tt}}$$

to accommodate the field at the flux valve location.

$$E1C' = E1C \frac{He_{fv}}{He_{tt}}$$

$$E2C' = E2C \frac{He_{fv}}{He_{tt}}$$

$$E2S' \; E2S \frac{He_{fv}}{He_{tt}}$$

Also, the swing bearing at the flux valve location is determined as:

$$SWGBRG(FV) = \tan^{-1}\left[\frac{He_{fv}\sin\Theta}{He_{fv}\cos\Theta}\right]$$

Before continuing, the field at the monitor 41 is read and the characterization values at the flux valve are modified as follows:

$$He_{fv}'\sin\theta = He_{MON}\sin\beta + delta - \sin 1$$

$$He_{fv}'\sin\theta = He_{MON}\sin\beta + delta - \cos 1$$

The total field is:

$$He_{fv}' = [(He_{fv}'\sin\theta)^2 + (He_{fv}'\cos\theta)^2]^{\frac{1}{2}}$$

The values of E1C', E2C' and E2S' are "normalized" to a standard field (i.e., about 0.18 Oersted) as follows:

$$E1CN = E1C' \frac{K}{He_{fv}'}$$

$$E2CN = E2C' \frac{K}{He_{fv}'}$$

$$E2SN = E2S' \frac{K}{He_{fv}'}$$

where K is a constant representing a standard field.

If the direction of the magnetic field has changed, the new swing line bearing is determined.

$$SWGBRG(FV) = \tan^{-1}\left[\frac{He_{fv}'\sin\Theta}{He_{fv}'\cos\Theta}\right]$$

The new swing line bearing is then displayed, and the operator rotates the flux valve to this bearing. An optical transfer adapter is attached to the flux valve. This transfer adapter contains a telescope with which a reference target bearing can be established. The aircraft flux valve 44 and optical alignment adapter are then removed from the turntable 72.

The aircraft 80 is now brought into position over the swing line 62. Any misalignment of the aircraft 80 with the swing line 62 is measured and entered into the compass calibration computer 45. The computer 45 calculates the misalignment angle and compensates for this misalignment by adding an angle to the value of the swing line bearing $\alpha$ in the swing equations. The optical alignment adapter 73 is also adjusted for this misalignment angle.

The aircraft flux valve 44, with the transfer adapter 73, is mounted in the aircraft 80 and the reference target sighted through the telescope 73. The aircraft flux valve 44 is secured and the telescope removed.

The compass calibration computer 45 is connected to the aircraft flux valve 44 and the compass system. The compass system output heading may be read out of the compass calibration computer 45, or via another readout in the aircraft 80, provided the readout is sufficiently accurate.

Before beginning the electrical swing and compensating the aircraft 80 compass system, magnetic field measurements are again made at the monitor 41 and the characterization values and swing line bearing modified as follows:

$$E1C''N = E1C \frac{He_{fv}''}{K}$$

$$E2C''N = E2C \frac{He_{fv}''}{K}$$

$$E2S''N = E2S \frac{He_{fv}''}{K}$$

and $$SWGBRG'(FV) = \tan^{-1}\left[\frac{He_{fv}''\sin\Theta}{He_{fv}''\cos\Theta}\right]$$

These values are now used in the swing equations to perform the electrical swing. The aircraft compass system may now be compensated using well known techniques.

This invention has been described herein in considerable detail in order to comply with the Pat. Statutes and to provide those skilled in the art with the information needed to apply the novel principles and to construct and use such specialized components as are required. However, it is to be understood that the invention can be carried out by specifically different equipment and devices, and that various modifications, can be accomplished without departing from the scope of the invention itself.

What is claimed is:

1. A flux valve based magnetic field measurement and compass calibration apparatus, wherein the flux valve includes a current servo interface, an x axis, a y axis, an A leg, a B leg, and a C leg, each leg having a coil, and a flux valve location, comprising:
   (a) a monitor flux valve having a means for axial alignment, an x axis, a y axis, a primary monitor flux valve location and a first means for connecting to compensation and measurement equipment;
   (b) a means for rotating a flux valve having a means for affixing a flux valve wherein the means for affixing a flux valve has a second means for connecting to compensation and measurement equipment and a means for rotating a flux valve location;

(c) a calibration computer having a display and plurality of means for connecting to a flux valve wherein the first said means for connecting to a flux valve is connected to the first means for connecting to compensation and measurement equipment and the second means for connecting to a flux valve is connected to the second means for connecting to compensation and measurement equipment; and (d) an optical transfer adapter means for attachment to any of the flux valves.

2. A method of compensating the flux valve in a object, the object having a object swing line, using the apparatus of claim 1 comprising the steps of:

(a) aligning the x axis of the flux valve with the object swing line and equating a primary swing line with the object swing line;

(b) removing the flux valve from the object and moving the object away from the location of the flux valve to substantially eliminate any magnetic effects due to the object;

(c) moving the monitor flux valve to the location of the flux valve, aligning the x axis of the monitor flux valve with the x axis of the flux valve, measuring the magnetic field at the flux valve location and relating the magnetic field to the vector equation $$He_{fv}Sin\theta + He_{fv}Cos\theta$$

where $He_{fv}$ is the horizontal field strength, $\theta$ is the direction of the magnetic field from the x axis of the flux valve, $He_{fv}Sin\theta$ is the y axis component of the magnetic field and $He_{fv}Cos\theta$ is the x axis component of the magnetic field;

(d) moving the monitor flux valve to the location of the flux valve rotating means, aligning the x axis of the monitor flux valve with the x axis of the flux valve, measuring the magnetic field at this location and relating the magnetic field to the equation $$He_{ft}Sin\theta + He_{ft}Cos\phi$$

where $He_{ft}$ is the horizontal field strength at this location, $\theta$ is the direction of the magnetic field from the x axis of the flux valve, $He_{ft}Sin\phi$ is the y axis component of the magnetic field and $He_{ft}Cos\phi$ is the x axis component of the magnetic field;

(e) moving the monitor flux valve to the primary monitor flux valve location, aligning the x axis of the monitor flux valve with the x axis of the flux valve, measuring the magnetic field at the primary monitor flux valve location and relating it to the equation $$He_{mon}Sin\beta + He_{mon}Cos\beta$$

where $He_{mon}$ is the horizontal field strength at the primary monitor flux valve location, $\beta$ is the direction of the magnetic field with respect to the x axis of the flux valve, $He_{mon}Sin\beta$ is the y axis component of the magnetic field and, $He_{mon}Cos\beta$ is the x axis component of the magnetic field;

(f) determining the differences between the flux valve magnetic field magnetic field denoted by delta__Sin1, in the y axis by subtracting the y axis component of the magnetic field at the flux valve location from the y axis component of the magnetic field at the primary monitor flux valve location according to the following equations (g) determining the differences in each of the flux valve and monitor flux valve x and y axes magnetic field components denoted by delta__Cos1 and delta__Sin2 according to the following equations $$delta\_Sin1 = He_{fv}Sin\theta - He_{mon}Sin\beta, \text{ and}$$

$$delta\_Cos1 = He_{fv}Cos\theta - He_{mon}Cos\beta;$$

(h) determining the differences in each of the flux valve and flux valve rotating means x and y axes magnetic field components denoted by delta__Cos2 and delta__Sin2 according to the following equations $$delta\_Sin2 = He_{fv}Sin\theta - He_{ft}Sin\phi, \text{ and}$$

$$delta\_Cos2 = He_{fv}Cos\theta - He_{ft}Cos\phi;$$

(i) describing the magnetic field at the primary monitor flux valve location in terms of the magnetic field at the location of the flux valve rotating means according to the following equations $$He_{fv}Sin\theta = He_{ft}Sin\phi + delta\_Sin2, \text{ and}$$

$$He_{fv}Sin\theta = He_{ft}Cos\phi + delta\_Cos2;$$

(j) describing the magnetic field at the flux valve location in terms of the magnetic field at the primary monitor flux valve location according to the following equations $$He_{fv}Sin\theta = He_{mon}Sin\beta + delta\_Sin1, \text{ and}$$

$$He_{fv}Cos\theta = He_{mon}Cos\beta + delta\_Cos1;$$

(k) placing the flux valve on the flux valve rotating means and rotating the flux valve axis on the flux valve rotating means in order to align the axis of the flux valve with the monitor flux valve;

(l) indexing the flux valve to generate deviations from true headings;

(m) performing a eight heading swing at 45 degree increments and recording the deviations at each heading;

(n) reading output voltages from the flux valve and recording the output voltages at the cardinal headings;

(o) determining an E1 voltage and an E2 voltage according to the following equations $$E1 = (voltage\ at\ 0\ degrees + voltage\ at\ 180\ degrees)/2$$

$$E2 = (voltage\ at\ 90\ degrees + voltage\ at\ 270\ degrees)/2;$$

(p) determining the equations for the currents going to the flux valve legs according to one of the following equations $$A_{LEG} = \cos(30)E1\ (cos\psi - cos\alpha) + E2\ (sin\psi - sin\alpha)$$

$B_{LEG}=0$ $C_{LEG}=E2(\sin\psi-\sin\alpha)$ where $\psi$ is the electrical swing angle, and $\alpha$ is the position of the flux valve on the turntable, which is set to 0 degrees;

(q) determining crosstalk values according to the following equations $$\Delta 180 = \frac{EL_{180} + MAN_{180}}{2}$$

$$\Delta 270 = \frac{(EL_{90} - MAN_{90}) + (EL_{270} - MAN_{270})}{2}$$

where EL is the electrical swing error at the respective heading and MAN is the heading error at the respective heading during the manual swing;

(r) determining the equation for the currents going to the flux valve legs according to the following equations $A_{LEG}=\cos(30)[E1(\cos\phi-\cos\alpha)+\Delta 270 \cdot E2(\sin\psi-\sin\alpha)]$ $B_{LEG}=0$ $C_{LEG}=E2(\sin\psi-\sin\alpha)-\Delta 180 \cdot [\cos(30) \cdot E1(\cos\psi-\cos\alpha)+E2(\sin\psi-\sin\alpha)]$ (s) performing a second electrical swing at $\alpha=0$, for $\psi$ values of 90 and 270 degrees and determining the value of EW according to the following equation $$EW = \frac{(EL_{90} - MAN_{90}) - (EL_{270} - MAN_{270})}{2}$$

where EL and MAN are the electrical and manual swing errors respectively;

(t) correcting the E1 value according to the following equation $E1C=E1(1-\tan(EW))$ where E1C is the corrected value of E1 this time for a $\alpha$ of 90 degrees, and $\psi$ values of 0 and 180 degrees;

(u) determining the value of NS according to the following equation;

$$NS = \frac{(EL_0 - MAN_0) - (EL_{180} - MAN_{180})}{2}$$

where EL and MAN are the electrical and manual swing errors respectively:

(v) correcting the value of E2 with the value of NS according to the following equation;

$E2C=E2(1+\tan(NS))$ where E2C is the corrected value of E2;

(w) performing a fair heading electrical swing using the corrected values of E1 and E2 with $\alpha=90$ degrees and $\psi=$ the intercardinal headings of 45, 135, 225, and 315 degrees and determining an ICARD value according to the following equation $ICARD=[(EL_{45}-MAN_{45})-(EL_{135}-MAN_{135})+(EL_{225}-MAN_{225})-(EL_{315}-MAN_{315})]/4$ where EL and MAN are the electrical and manual swing errors at the respective headings:

(x) correcting the value of E2C with the value of ICARD according to the following equation $$E2S = E2C\left[\frac{1-\tan ICARD}{1+\tan ICARD}\right]$$

where E2S is the corrected value of E2C;

(y) using the value of E1C as an approximation for E1S;

(z) determining a set of swing equations according to the following equations $A_{LEG}=\cos(30) \cdot E1C(\cos\alpha-\cos\theta)+(\Delta 270+0.5)(E2S \cdot \sin\psi-E2C \cdot \sin\theta)$ $B_{LEG}=0$ $C_{LEG}=E2S \cdot \sin\psi-E2C \cdot \sin\alpha-\Delta 180[\cos(30) \cdot E1C \cdot (\cos\psi-\cos\alpha)+0.5(E2S \sin\psi-E2C \cdot \sin\alpha)$ where the values of E1C, E2C, $\Delta 180$, $\Delta 270$, and E2S are the characterization values for the particular flux valve being swung;

(aa) modifying the values of E1C, E2C, and E2S for the flux valve location according to the following equations the field $He_{fv}$ is $He_{fv}=[(He_{fv}\sin\theta)^2+(He_{fv}\cos\theta)^2]^{\frac{1}{2}}$ and the field $He_{tt}$ is $He_{tt}=[(He_{tt}\sin\theta)^2+(He_{tt}\cos\theta)^2]^{\frac{1}{2}}$ and multiplying the values of E1C, E2C and E2S by the factor $$\frac{He_{fv}}{He_{tt}}$$

to accommodate the field at the flux valve location according to the following equation:

$$E1C = E1C\frac{He_{fv}}{He_{tt}}$$

$$E2C = E2C\frac{He_{fv}}{He_{tt}}$$

$$E2S = E2S\frac{He_{fv}}{He_{tt}}$$

(ab) determining a flux valve swing line bearing angle at the flux valve location according to the following equation:

$$SWGBRG(FV) = \tan^{-1}\left[\frac{He_{fv}\sin\theta}{He_{fv}\cos\theta}\right]$$

(ac) reading the magnetic field at the monitor flux valve location and modifying the characterization values for the flux valve according to the following equation:

$$He_{fv}'\sin\theta = He_{MON}\sin\beta + delta\_sin1$$

$$He_{fv}'\sin\theta = He_{MON}\sin\beta + delta\_cos1$$

(ad) determining the magnetic field at the flux valve according to the following equation $$He_{fv}' = [(He_{fv}'\sin\theta)^2 + (He_{fv}'\cos\theta)^2]^{-\frac{1}{2}}$$

(ae) normalizing the values of $E1C^1$, $E2C^1$ and $E2S^1$ to a standard field according to the following equations $$E1CN = E1C \frac{K}{He_{fv}'}$$

$$E2CN = E2C \frac{K}{He_{fv}'}$$

$$E2SN = E2S \frac{K}{He_{fv}'}$$

where K is a constant representing a standard magnetic field;

(af) determining a new swing line bearing according to the following equation $$SWGBRG(FV) = \tan^{-1}\left[\frac{He_{fv}'\sin\theta}{He_{fv}'\cos\theta}\right]$$

if the direction of the magnetic field has changed;

(ag) attaching the optical transfer adapter means to the flux valve rotating means and rotating the flux valve to the new swing line bearing using the optical transfer adapter means;

(ah) removing the flux valve and optical alignment adapter means from the flux valve rotating means;

(ai) moving the object over the primary swing line, aligning the object swing line with the primary swing line, measuring a misalignment angle of the object swing line with the primary swing line, compensating for the misalignment angle by adding the misalignment angle to the value of the swing line bearing angle in the set of swing equations;

(aj) adjusting the optical transfer adapter means for the misalignment angle and mounting the optical transfer adapter means on the flux valve;

(ak) mounting the flux valve with the optical transfer adapter means in the object and aligning the flux valve x axis with the object swing line;

(al) securing the flux valve in the object and removing the optical transfer adapter means from the flux valve; and (am) measuring the magnetic field at the primary monitor flux valve location and modifying the characterization values and swing line bearing according to the following equations $$E1C'N = E1C' \frac{He_{fv}''}{K}$$

-continued $$E2C'N = E2C' \frac{He_{fv}''}{K}$$

$$E2S'N = E2S' \frac{He_{fv}''}{K}$$

and $$SWGBRG(FV) = 0 = \tan^{-1}\left[\frac{He_{fv}''\sin\theta}{He_{fv}''\cos\theta}\right]$$

thereby determining the fully compensated magnetic field.

3. A method of compensating the flux valve in a object, the object having a first swing line, according to the method of claim 2 wherein the location of the flux valve rotating means is in the same location as the flux valve.

4. The method of claim 2 wherein the flux valve rotating means includes indicia thereon and the step of indexing the object flux valve further comprises the steps of aligning the coil of the A leg with the magnetic field by rotating the flux valve on the means for rotating a flux valve at all the cardinal headings, noting the heading output from the flux valve, reading the deviations of the flux valve readings from the flux valve rotating means indicia, and calculating the index by adding the deviations and dividing by four.

5. The method of claim 2 wherein the standard field is about 0.18 Oersted.

6. A flux valve based magnetic field measurement and compass calibration apparatus, wherein the flux valve includes a control transformer interface, an x axis, a y axis, an A leg, a B leg, and a C leg, each leg having a coil, and a flux valve location, comprising:

(a) a monitor flux valve having a means for axial alignment, an x axis, a y axis, a primary monitor flux valve location and a first means for connecting to compensation and measurement equipment;

(b) a means for rotating a flux valve having a means for affixing a flux valve wherein the means for affixing a flux valve has a second means for connecting to compensation and measurement equipment and a means for rotating a flux valve location;

(c) a calibration computer having a display and plurality of means for connecting to a flux valve wherein the first said means for connecting to a flux valve is connected to the first means for connecting to compensation and measurement equipment and the second means for connecting to a flux valve is connected to the second means for connecting to compensation and measurement equipment; and (d) an optical transfer adapter means for attachment to any of the flux valves.

7. A method of compensating the flux valve in a object, the object having a object swing line, using the apparatus of claim 6 comprising the steps of:

(a) aligning the x axis of the flux valve with the object swing line and equating a primary swing line with the object swing line;

(b) removing the flux valve from the object and moving the object away from the location of the flux valve to substantially eliminate any magnetic effects due to the object;

(c) moving the monitor flux valve to the location of the flux valve, aligning the x axis of the monitor flux valve with the x axis of the flux valve, measuring the magnetic field at the flux valve location and relating the magnetic field to the vector equation $$He_{fv}Sin\theta + He_{fv}Cos\theta$$

where $He_{fv}$ is the horizontal field strength, $\theta$ is the direction of the magnetic field from the x axis of the flux valve, $He_{fv}Sin\theta$ is the y axis component of the magnetic field and $He_{fv}Cos\theta$ is the x axis component of the magnetic field;

(d) moving the monitor flux valve to the location of the flux valve rotating means, aligning the x axis of the monitor flux valve with the x axis of the flux valve, measuring the magnetic field at this location and relating the magnetic field to the equation $$He_{tt}Sin\theta + He_{tt}Cos\phi$$

where $He_{tt}$ is the horizontal field strength at this location, 8 is the direction of the magnetic field from the x axis of the flux valve, $He_{tt}Sin\phi$ is the y axis component of the magnetic field and $He_{tt}Cos\phi$ is the x axis component of the magnetic field;

(e) moving the monitor flux valve to the primary monitor flux valve location, aligning the x axis of the monitor flux valve with the x axis of the flux valve, measuring the magnetic field at the primary monitor flux valve location and relating it to the equation $$He_{mon}Sin\beta + He_{mon}Cos\beta$$

where $He_{mon}$ is the horizontal field strength at the primary monitor flux valve location, $\beta$ is the direction of the magnetic field with respect to the x axis of the flux valve, $He_{mon}Sin\beta$ is the y axis component of the magnetic field and, $He_{mon}Cos\beta$ is the x axis component of the magnetic field;

(f) determining the differences between the flux valve magnetic field magnetic field denoted by delta—Sin1, in the y axis by subtracting the y axis component of the magnetic field at the flux valve location from the y axis component of the magnetic field at the primary monitor flux valve location according to the following equations (g) determining the differences in each of the flux valve and monitor flux valve and y axes magnetic field components denoted by delta—$_{Cos}$1 and delta—$_{Sin}$1 according to the following equations $$delta\_Sin1 = He_{fv}Sin\theta - He_{mon}Sin\beta, \text{ and}$$

$$delta\_Cos1 = He_{fv}Cos\theta - He_{mon}Cos\beta;$$

(h) determining the differences in each of the flux valve and flux valve rotating means x and y axes magnetic field components denoted by delta—$_{Cos}$2 and delta—$_{Sin}$2 according to the following equations $$delta\_Sin2 = He_{fv}Sin\theta - He_{tt}Sin\phi, \text{ and}$$

$$delta\_Cos2 = He_{fv}Cos\theta - He_{tt}Cos\phi;$$

the magnetic field and $He_{fv}Cos\theta$ is the x axis component of the magnetic field;

location, $\theta$ is the direction of the magnetic field (i) describing the magnetic field at the primary monitor flux valve location in terms of the magnetic field at the location of the flux valve rotating means according to the following equations $$He_{fv}Sin\theta = He_{tt}Sin\phi + delta\_Sin2, \text{ and}$$

$$He_{fv}Cos\theta = He_{tt}Cos\phi + delta\_Cos2;$$

(j) describing the magnetic field at the flux valve location in terms of the magnetic field at the primary monitor flux valve location according to the following equations $$He_{fv}Sin\theta = He_{mon}Sin\beta + delta\_Sin1, \text{ and}$$

$$He_{fv}Cos\theta = He_{mon}Cos\beta + delta\_Cos1;$$

(k) placing the flux valve on the flux valve rotating means and rotating the flux valve axis on the flux valve rotating means in order to align the axis of the flux valve with the monitor flux valve;

(l) indexing the flux valve to generate deviations from true headings;

(m) performing a eight heading swing at 45 degree increments and recording the deviations at each heading;

(n) reading output voltages from the flux valve and recording the output voltages at the cardinal headings;

(o) determining an E1 voltage and an E2 voltage according to the following equations $$E1 = (voltage\ at\ 0\ degrees + voltage\ at\ 180\ degrees)/2$$

$$E2 = (voltage\ at\ 90\ degrees + voltage\ at\ 270\ degrees)/2;$$

(p) determining the equations for the currents going to the flux valve legs according to the following equations $$A_{LEG} = cos(30)E1(cos\psi - cos\alpha)$$

$$B_{LEG} = 0.5E2(sin\psi - sin\alpha)$$

$$C_{LEG} = 0.5E2(sin\psi - sin\alpha)$$

where $\psi$ is the electrical swing angle, and $\alpha$ is the position of the flux value on the turntable, which is set to 0 degrees;

(q) determining crosstalk values according to the following equations $$\Delta 180 = \frac{EL_{180} + MAN_{180}}{2}$$

$$\Delta 270 = \frac{(EL_{90} - MAN_{90}) + (EL_{270} - MAN_{270})}{2}$$

where EL is the electrical swing error at the respective heading and MAN is the heading error at the respective heading during the manual swing;

(r) determining the equation for the currents going to the flux valve legs according to the following equations $$A_{LEG} = \cos(30)[E1(\cos\psi - \cos\alpha) + \Delta 270 \cdot E2(\sin\psi - \sin\alpha)]$$

$$B_{LEG} = 0.5 \cdot E2(\sin\psi - \sin\alpha) - \Delta 180 \cdot \cos(30) \cdot E1(\cos\psi - \cos\alpha)$$

$$C_{LEG} = -B_{LEG}$$

(s) performing a second electrical swing at $\alpha = 0$, for $\psi$ values of 90 and 270 degrees and determining the value of EW according to the following equation $$EW = \frac{(EL_{90} - MAN_{90}) - (EL_{270} - MAN_{270})}{2}$$

where EL and MAN are the electrical and manual swing errors respectively;

(t) correcting the E1 value according to the following equation $$E1C = E1(1 - \tan(EW))$$

where E1C is the corrected value of E1 this time for a $\alpha$ of 90 degrees, and $\psi$ values of 0 and 180 degrees;

(u) determining the value of NS according to the following equation;

$$NS = \frac{(EL_0 - MAN_0) - (EL_{180} - MAN_{180})}{2}$$

where EL and MAN are the electrical and manual swing errors respectively;

(v) correcting the value of E2 with the value of NS according to the following equation;

$$E2C = E2(1 + \tan(NS))$$

where E2C is the corrected value of E2;

(w) performing a fair heading electrical swing using the corrected values of E1 and E2 with $\alpha = 90$ degrees and $\psi =$ the intercardinal headings of 45, 135, 225, and 315 degrees and determining an ICARD value according to the following equation $$ICARD = [(EL_{45} - MAN_{45}) - (EL_{135} - MAN_{135}) + (EL_{225} - MAN_{225}) - (EL_{315} - MAN_{315})]/4$$

where EL and MAN are the electrical and manual swing errors at the respective headings;

(x) correcting the value of E2C with the value of ICARD according to the following equation $$E2S = E2C \left[ \frac{1 - \tan ICARD}{1 + \tan ICARD} \right]$$

where E2S is the corrected value of E2C;

(y) using the value of E1C as an approximation for E1S;

(z) determining a set of swing equations according to the following equations $$A_{LEG} = \cos(30) \cdot E1C(\cos\psi - \cos\alpha) + \Delta 270(E2S \cdot \sin\psi - E2C \cdot \sin\alpha)$$

$$B_{LEG} = 0.5(E2S \cdot \sin\psi - E2\sin\alpha) - \Delta 180 \cdot \cos(30) \cdot E1C(\cos\psi - \cos\alpha)$$

$$C_{LEG} = -B_{LEG}$$

where the values of E1C, E2C, $\Delta 180$, $\Delta 270$, and E2S are the characterization values for the particular flux valve being swung;

(aa) modifying the values of E1C, E2C, and E2S for the flux valve location according to the following equations the field $He_{fv}$ is $$He_{fv} = [(He_{fv}\sin\theta)^2 + (He_{fv}\cos\theta)^2]^{\frac{1}{2}}$$

and the field $He_{tt}$ is $$He_{tt} = [(He_{tt}\sin\theta)^2 + (He_{tt}\cos\theta)^2]^{\frac{1}{2}}$$

and multiplying the values of E1C, E2C and E2S by the factor $$\frac{He_{fv}}{He_{tt}}$$

to accommodate the field at the flux valve location according to the following equation:

$$E1C = E1C \frac{He_{fv}}{He_{tt}}$$

$$E2C = E2C \frac{He_{fv}}{He_{tt}}$$

$$E2S = E2S \frac{He_{fv}}{He_{tt}}$$

(ab) determining the flux valve swing line bearing angle at the flux valve location according to the following equation:

$$SWGBRG(FV) = \tan^{-1}\left[ \frac{He_{fv} \sin\Theta}{He_{fv} \cos\Theta} \right]$$

(ac) reading the magnetic field at the monitor flux valve location and modifying the characteristic values for the flux valve according to the following equation:

$$He_{fv}'\sin\theta = He_{MON}\sin\beta + \text{delta } \sin 1$$

$$He_{fv}'\sin\theta = He_{MON}\sin\beta' \text{delta } \cos 1$$

(ad) determining the magnetic field at the flux valve according to the following equation $$He_{fv}' = [(He_{fv}'\sin\theta)^2 + (He_{fv}'\cos\theta)^2]^{\frac{1}{2}}$$

(ae) normalizing the values of $E1C^1$, $E2C^1$ and $E2S^1$ to a standard field according to the following equations $$E1CN = E1C \frac{K}{He_{fv}'}$$

-continued $$E2CN = E2C \frac{K}{He_{fv}'}$$

$$E2S'N = E2S' \frac{K}{He_{fv}'}$$

where K is a constant representing a standard magnetic field;

(af) determining a new swing line bearing according to the following equation $$SWGBRG(FV) = \tan^{-1}\left[\frac{He_{fv}\sin\Theta}{He_{fv}\cos\Theta}\right]$$

if the direction of the magnetic field has changed;

(ag) attaching the optical transfer adapter means to the flux valve rotating means and rotating the flux valve to the new swing line bearing using the optical transfer adapter means;

(ah) removing the flux valve and optical alignment adapter means from the flux valve rotating means;

(ai) moving the object over the primary swing line, aligning the object swing line with the primary swing line, measuring a misalignment angle of the object swing line with the primary swing line, compensating for the misalignment angle by adding the misalignment angle to the value of the swing line bearing angle in the set of swing equations;

(aj) adjusting the optical transfer adapter means for the misalignment angle and mounting the optical transfer adapter means on the flux valve;

(ak) mounting the flux valve with the optical transfer adapter means in the object and aligning the flux valve x axis with the object swing line;

(al) securing the flux valve in the object and removing the optical transfer adapter means from the flux valve; and (am) measuring the magnetic field at the primary monitor flux valve location and modifying the characterization values and swing line bearing according to the following equations $$E1C''N = E1C \frac{He_{fv}''}{K}$$

$$E2C''N = E2C \frac{He_{fv}''}{K}$$

$$E2S''N = E2S \frac{He_{fv}''}{K}$$

and $$SWGBRG(FV) = 0 = \tan^{-1}\left[\frac{He_{fv}''\sin\Theta}{He_{fv}''\cos\Theta}\right]$$

thereby determining the fully compensated magnetic field.

8. A method of compensating the flux valve in an object, the object having an object swing line, according to the method of claim 7 wherein the location of the flux valve rotating means is in the same location as the flux valve.

9. The method of claim 7 wherein the flux valve rotating means includes indicia thereon and the step of indexing the object flux valve further comprises the steps of aligning the coil of the A leg with the magnetic field by rotating the flux valve on the means for rotating a flux valve at all the cardinal headings, noting the heading output from the flux valve, reading the deviations of the flux valve readings from the flux valve rotating means indicia, and calculating the index by adding the deviations and dividing by four.

10. The method of claim 7 wherein the standard field is about 0.18 Oersted.

* * * * *

UNITED STATES PATENT AND TRADEMARK OFFICE
CERTIFICATE OF CORRECTION

PATENT NO. : 5,065,521

DATED : November 19, 1991

INVENTOR(S) : John L. Waldrop, et al.

It is certified that error appears in the above-identified patent and that said Letters Patent is hereby corrected as shown below:

Column 17, Line 41, delete the first occurrence of the words "magnetic field".

Column 20, Lines 53 and 56, delete the word "delta" from both equations and replace it with -- delta_ -- in both equations.

Column 12, Line 7, delete the word "Sin2" and replace it with -- Sin1 --.

Column 13, Line 24, delete the word "(cos$\phi$" and replace it with -- (cos$\psi$ --.

Column 17, Line 21, delete the number "8" and replace it with -- $\theta$ --.

Column 17, Line 47, insert -- x -- after the second occurrence of the word "valve".

Column 17, Line 65, delete the phrase "the magnetic field and $HE_{fv} Cos\theta$ is the x axis component of the magnetic field; location, is the direction of the magnetic field".

Column 19, Line 52, delete "[/4" at the very end of the equation and replace it with -- ]/4 --.

Column 20, Line 5, delete "E2sin$\alpha$" and replace it with -- E2C·sin$\alpha$ --.

Column 20, Line 51, delete the word "characteristic" and replace it with -- characterization --.

UNITED STATES PATENT AND TRADEMARK OFFICE
CERTIFICATE OF CORRECTION

PATENT NO. : 5,065,521

DATED : November 19, 1991

INVENTOR(S) : John L. Waldrop, et al.

It is certified that error appears in the above-identified patent and that said Letters Patent is hereby corrected as shown below:

Column 22, line 21, delete "SWGBRG" and replace it with --SWGBRG'--.

Signed and Sealed this

Thirteenth Day of April, 1993

*Attest:*

STEPHEN G. KUNIN

*Attesting Officer*     Acting Commissioner of Patents and Trademarks